US 7,596,719 B2

(12) United States Patent
Pedersen (10) Patent No.: US 7,596,719 B2
(45) Date of Patent: Sep. 29, 2009

(54) MICROCONTROLLER INFORMATION EXTRACTION SYSTEM AND METHOD

(75) Inventor: Frode Milch Pedersen, Trondheim (NO)

(73) Assignee: ATMEL Corporation, San Jose, CA (US)

( * ) Notice: Subject to any disclaimer, the term of this patent is extended or adjusted under 35 U.S.C. 154(b) by 498 days.

(21) Appl. No.: 11/354,339

(22) Filed: Feb. 14, 2006

(65) Prior Publication Data

US 2007/0220333 A1   Sep. 20, 2007

(51) Int. Cl.
*G06F 11/00* (2006.01)
(52) U.S. Cl. ........................................................ 714/31
(58) Field of Classification Search ................... 714/31
See application file for complete search history.

(56) References Cited

U.S. PATENT DOCUMENTS

| 5,564,041 | A | 10/1996 | Matsui et al. |
| 5,724,505 | A | 3/1998 | Argade et al. |
| 6,185,732 | B1 | 2/2001 | Mann et al. |
| 6,289,300 | B1 | 9/2001 | Brannick et al. |
| 6,324,684 | B1 | 11/2001 | Matt et al. |
| 6,374,367 | B1 * | 4/2002 | Dean et al. ..................... 714/37 |
| 6,957,180 | B1 | 10/2005 | Nemecek |
| 7,216,276 | B1 * | 5/2007 | Azimi et al. ................. 714/733 |
| 7,237,149 | B2 * | 6/2007 | Moyer et al. ................... 714/30 |
| 7,281,162 | B2 * | 10/2007 | McDonald-Maier et al. .. 714/30 |
| 7,325,164 | B2 * | 1/2008 | Swanson et al. .............. 714/30 |
| 2004/0205410 | A1 | 10/2004 | McDonald-Maier et al. |
| 2004/0250164 | A1 * | 12/2004 | Ahmad et al. ................. 714/30 |

FOREIGN PATENT DOCUMENTS

| GB | 2 350 215 | 11/2000 |
| JP | 02001084161 A * | 3/2001 |
| WO | WO 02/48722 | 6/2002 |

* cited by examiner

*Primary Examiner*—Michael C Maskulinski
(74) *Attorney, Agent, or Firm*—Fish & Richardson P.C.

(57) ABSTRACT

A system for debugging a device under test may include a processor register with a program count and a debug program register that receives the program count upon execution of an instruction by a processor. In one implementation, a microcontroller under test by a debugger is accessed using a serial interface, such as a JTAG interface. The interface can communicate directly with a debug register to retrieve program count values, both when the microcontroller is halted and when it is executing instructions. The polling interval to retrieve the program count values may be adjusted by a user of the debugger based on considerations such as bandwidth and accuracy. The microcontroller may transmit the program count value to the debug register from a processing register that is not accessible to the debugger.

14 Claims, 5 Drawing Sheets

MICROCONTROLLER INFORMATION EXTRACTION SYSTEM AND METHOD

BACKGROUND

Some microcontroller systems include integrated on-chip debug features that permit a user to debug programs executed on the microcontroller system. Low bandwidth features, such as break points and run/stop control, can be accessed by a serial protocol, such as Joint Test Action Group (JTAG). For high bandwidth features, such as real-time capture of program count (PC) values, a more complex parallel trace port may be required.

In some systems, the JTAG interface may require the CPU to be halted in a debug mode for the JTAG interface to transmit commands to observe the state of the system. One task during a typical debug session is determining the location of the current PC when the CPU is halted in debug mode. In some conventional systems, the PC values can be saved in a processor register when the CPU is halted in debug mode. In some current systems, the processor register cannot be read directly by the JTAG interface, but must be transferred from the processor register to a debug register readable by the JTAG interface. This may be accomplished by scanning in a number of CPU instructions using the JTAG interface. The instructions direct the processor to transfer the PC value to a debug register that the JTAG interface may access. This procedure can enable the debugger to observe the PC of the CPU, but it is complicated and may require the debugger to have explicit knowledge of the register implementation and the instruction operational codes of the CPU so that the debugger may issue commands to the CPU to move the PC value from the processor register to the debug register.

SUMMARY

A system for debugging a device under test may include a processor register with a program counter and a debug program register that receives the program count upon execution of an instruction by a processor. In certain implementations, a microcontroller under test by a debugger is accessed using a serial interface, such as a JTAG interface. In such implementations the interface can communicate directly with a debug register to retrieve program count values, both when the microcontroller is halted and when it is executing instructions. In these implementations the polling interval to retrieve the program count values may be adjusted by a user of the debugger based on considerations such as bandwidth and accuracy. The microcontroller of these implementations may transmit the program count value to the debug register from a processing register that is not accessible to the debugger. Such microcontroller may transmit an execution signal to the debug register after an instruction has been executed, where the signal enables the debug register to receive the program count from the microcontroller.

The systems and techniques described here may provide one or more of the following advantages. First, access to the program counter when the CPU is halted may be simplified. Second, code profiling for long runtimes may be facilitated. Third, the cost and complexity of hardware for retrieving program count values during runtime operation may be substantially reduced. Fourth, the need for a debugger to store information, such as microcontroller operational codes and microcontroller internal register architecture information, may be reduced or eliminated. Moreover, a unified structure and method for accessing program count values when a microcontroller is halted or executing may be provided.

The details of one or more embodiments are set forth in the accompanying drawings and the description below. Other features, aspects, and advantages of the embodiments will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION OF ILLUSTRATIVE EMBODIMENTS

Figure 1:
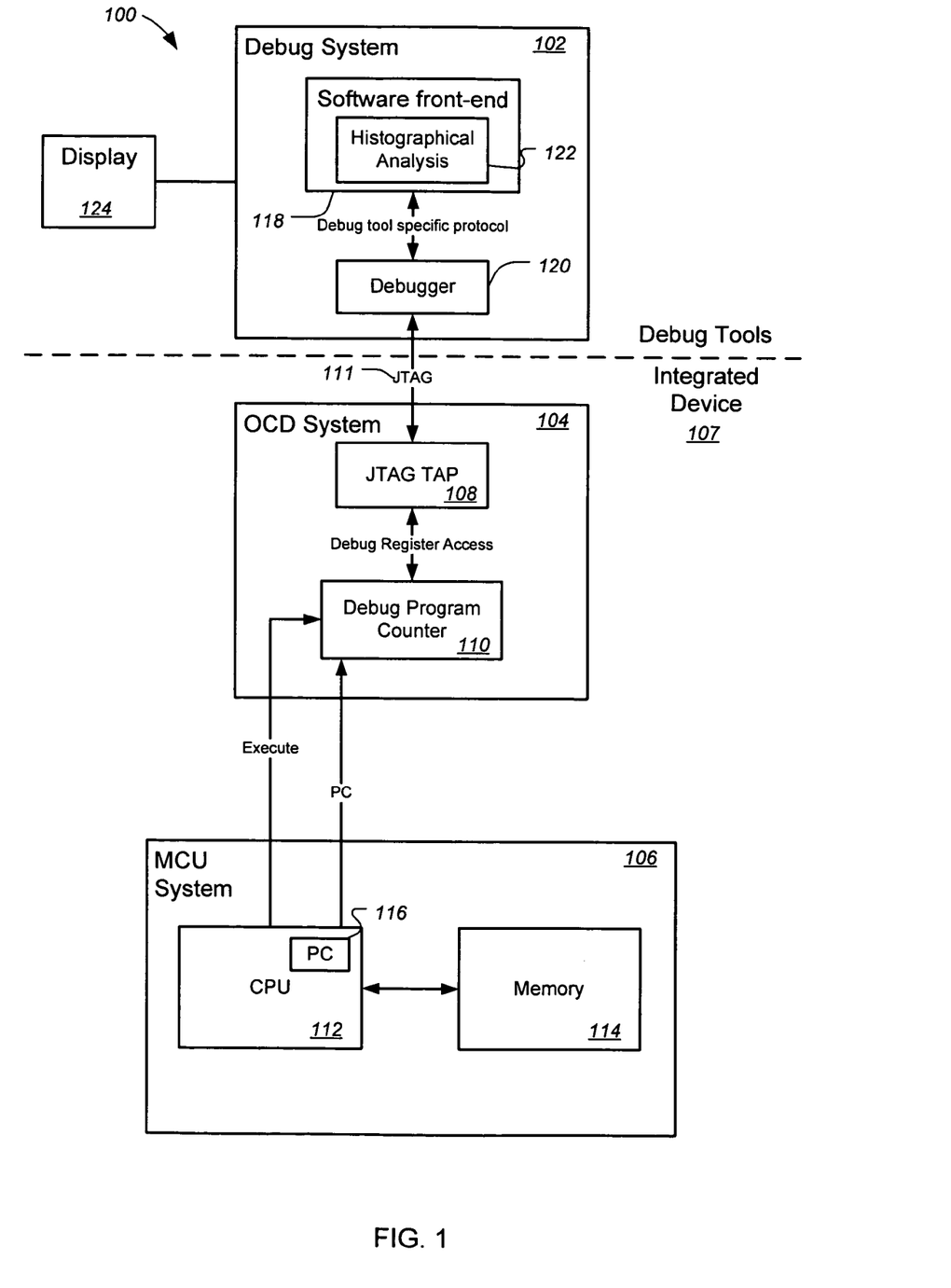
FIG. 1 is a schematic diagram of an illustrative test system for debugging a device, such as a microcontroller.

FIG. 1 shows an illustrative test system 100 for debugging a device. Reference will be made to debugging a microcontroller, though other devices are possible. Test system 100 includes a debug system 102, an on-chip debug (OCD) system 104, and a device (e.g., microcontroller unit (MCU) system 106). In this example, the OCD system 104 is integrated with the MCU system 106 on an integrated device 107 and is accessible by the debug system 102 via a serial interface, such as a Joint Test Action Group (JTAG) communication interface, a NEXUS (IEEE-ISTO 5001 standard) debug interface, and an advance user debug (AUD) interface etc. During a debugging session, a user, such as a test engineer, a software developer, or other debugging engineer, can operate the debug system 102 to halt processing of the MCU system 106 and to monitor the state of the MCU system 106. In one example, the user uses the serial interface to determine the current memory address, or program count value, of the executed software instruction when the MCU system 106 is halted.

In another example, the user uses the debug system 102 to retrieve the program count values while the MCU system 106 is executing instructions. The retrieved program count values can be used to determine a code profile, which specifies how much time the MCU system 106 spends executing different sections, or blocks, of instructions. The test system 100 can permit the debug system 102 to directly monitor the address of the executed instruction, both when the MCU system 106 is halted or when the MCU system 106 is executing instructions.

In this example, the debug tool 102 is connected to the MCU system 106 via the OCD system 104. The OCD system includes a JTAG test access port (TAP) 108 and a debug program counter (DPC) 110, which is directly accessible by the debug system 102. The JTAG TAP 108 is a serial data interface for JTAG signals. The DPC 110 can be dynamically updated with information, such as memory addresses, of the executed program code executed by the MCU system 106. During run-time, the debug tool 102 can, without knowledge of operational codes used by the MCU system 106, directly read the DPC register 110 to obtain the executed program code through a serial interface (e.g., the JTAG TAP 108), which facilitates a serial connection (e.g., a JTAG connection as shown by an arrow 111).

The MCU system 106 can include a CPU 112 and a memory 114. The CPU 112 can execute program code stored in the memory 114. In some embodiments, the CPU 112 includes a number of registers, which are not directly accessible by the debug system 102. If a CPU register that holds the PC value is not directly accessible to the debugger system 102, the debugger system 102 can, for example, halt the CPU 112 and issue an instruction to the CPU 112 to move data in the register to a register that is directly accessible before reading the data. In this example, the CPU 112 includes a program counter (PC) 116, which is a register that stores a memory address of the program instruction that is currently being executed by the CPU 112. In one example, during run-time, the CPU 112 fetches the next instruction from the memory 114 based on the memory address in the PC 116.

The user of the system 100 can obtain the value stored in the PC 116 using the debug system 102. The debug system 102 includes a front end (e.g., software front-end 118) and a debugger 120. The software front-end 118 can include software executed on a computing device, such as user interface software, testing code, analysis code, or code to output information obtained during debugging operations. The software code can be predefined in the debug system 102, or it can be downloaded to the debug system 102. As an example, the user uses the software front-end 118 to implement debug software that monitors and analyzes program code executed in the MCU system 106.

In some implementations, the debugger 120 and the software front-end 118 are software loaded on the same computing device. The debugger 120 transmits the program count values to the software front-end 118 using protocols specific to the debugger 120. In other implementations, the debugger 120 is separate computing code running on a computing device that is connected or networked to a separate computing device, such as a personal computer, that runs the software front-end 118. The debugger 120 transmits the program count values to the software front-end 118 through an interface between the debugger 120 and the computing device running the software front-end 118.

In some embodiments, the software front-end 118 includes software analysis code that provides, for example, histogram analysis and trace capturing analysis. The software front-end 118 can include a histographical analysis module 122. The user can use the histographical analysis module 122 to create an analysis of cumulated time spent executing separate sections of program code run by the MCU system 106. For example, the histographical analysis module 122 can perform a code profiling operation.

In some implementations, the code profiling is a process of benchmarking the execution of one or more program code sections to determine where processing time is being spent. For example, the code profiling can facilitate identification of code sections that are responsible for the bulk of execution time. Based on a result of the code profiling, called a code profile, the user can determine areas of the code that may need optimization. An exemplary graphical result of a code profile is described in greater detail with reference to FIG. 3B.

In this example, the histographical analysis module 122 can determine and analyze an amount of time spent by the CPU 112 to execute a group of instructions used to perform a particular method, or function, in the program code. The histographical analysis module 122 can gather and analyze this information for multiple segments related to the code executed by the MCU system 106.

The test system 100 also includes a display device 124 that is connected to the debug system 102 to display the results obtained from the histographical analysis and to display other results, such as individual program count values retrieved from the DPC 110 after the CPU 112 is halted.

The software front-end 118 can communicate with the debugger 120. The debugger 120, for example, can receive instructions from the software front-end 118 and can transmit debugging results to the software front-end 118. In turn, the debugger 120 can send and receive debug information via a JTAG communication link to the OCD system 104. For example, the debugger 120 can send a "halt" command to the MCU system 106 using the JTAG communication link to the OCD system 104 to stop the MCU system 106 from processing instructions. In another example, the debugger 120 can communicate with the OCD system 104 to access the DPC 110 to obtain a memory address.

During execution, the CPU 112 can fetch the next instruction stored at the address identified by the PC 116. Every time the CPU executes an instruction, the value within the PC 116 may be transmitted automatically to the DPC 110. During a debugging session, the debugger 120 can send a halt instruction or signal through the JTAG TAP 108 to stop the CPU 112 from processing. At this point, the DPC 110 contains the program count value of the instruction executed when the CPU 112 was halted. Because the debugger 120 has direct access to the DPC 110, the current program count is directly observable without issuing instructions to the CPU 112 to move the program count value from the PC 116 to a register accessible by the debugger 120. This may eliminate the need for the debugger 120 to communicate with the CPU 112 using operational codes. Additionally, having direct access to the program count value may also eliminate the need for the debugger 120 to know the register address of the PC and another register accessible to the debugger because the debugger is not required to issue instructions to the CPU 112 requesting the program count value be moved from the PC 116 to the other accessible register.

In another example, the DPC 110 can be read by the debugger 120 continuously while the CPU 112 is executing the program code. For example, the debugger 120 can continuously read the DPC 110 and store the program count values in a buffer (not shown) located at the debugger 120. In some implementations, the software front-end 118 constructs a statistical model of the code profile using only a sample of a larger set of program count values. For example, the debugger 120 can set a poll interval of 5 reads per millisecond (ms), meaning the debugger 120 will read the DPC 110 every 0.2 ms. The limited polling interval may not capture all program count values stored in the DPC 110, but instead may only capture a subset of the program count values, which are present in the DPC 110 every 0.2 ms.

If the debugger 120 has limited bandwidth capabilities, then the user can set the polling interval to occur at a greater time period, which will decrease the number of program counts to retrieve and store. Alternatively, if multiple sections of code require a similar amount of time to execute, then the polling interval can be decreased to increase the accuracy of the analysis in order to adequately distinguish the time period required by each code section. Depending on the bandwidth and the accuracy requirements of the statistical model, the polling interval of the DPC 110 can be adjusted by the debug system 102.

In another implementation, the debug system 102 supports code profiling for program code that has an extended runtime, such as a program code that includes a large amount of instructions, using a relatively limited buffer capacity. For example, the debugger 120 can limit the number of buffered program count values. When the buffer is full, the debugger 120 can wait for the histographical analysis module 122 to finish processing all the buffered program count values before reading new program count values. In this case, only a relatively small amount of memory space will be needed to construct a statistical model of the code profile for a program code with extended runtime.

In yet another implementation, a histogram is built in the debugger 120 at the same time the program count values are retrieved from the DPC 110. The buffer does not have to be full before the histographical analysis module 122 processes the program count values. In other words, the debug system 102 accumulates the program count value in a histogram in the debugging device. As the histogram is constructed, it can also be shown on the display 124.

Figure 2:
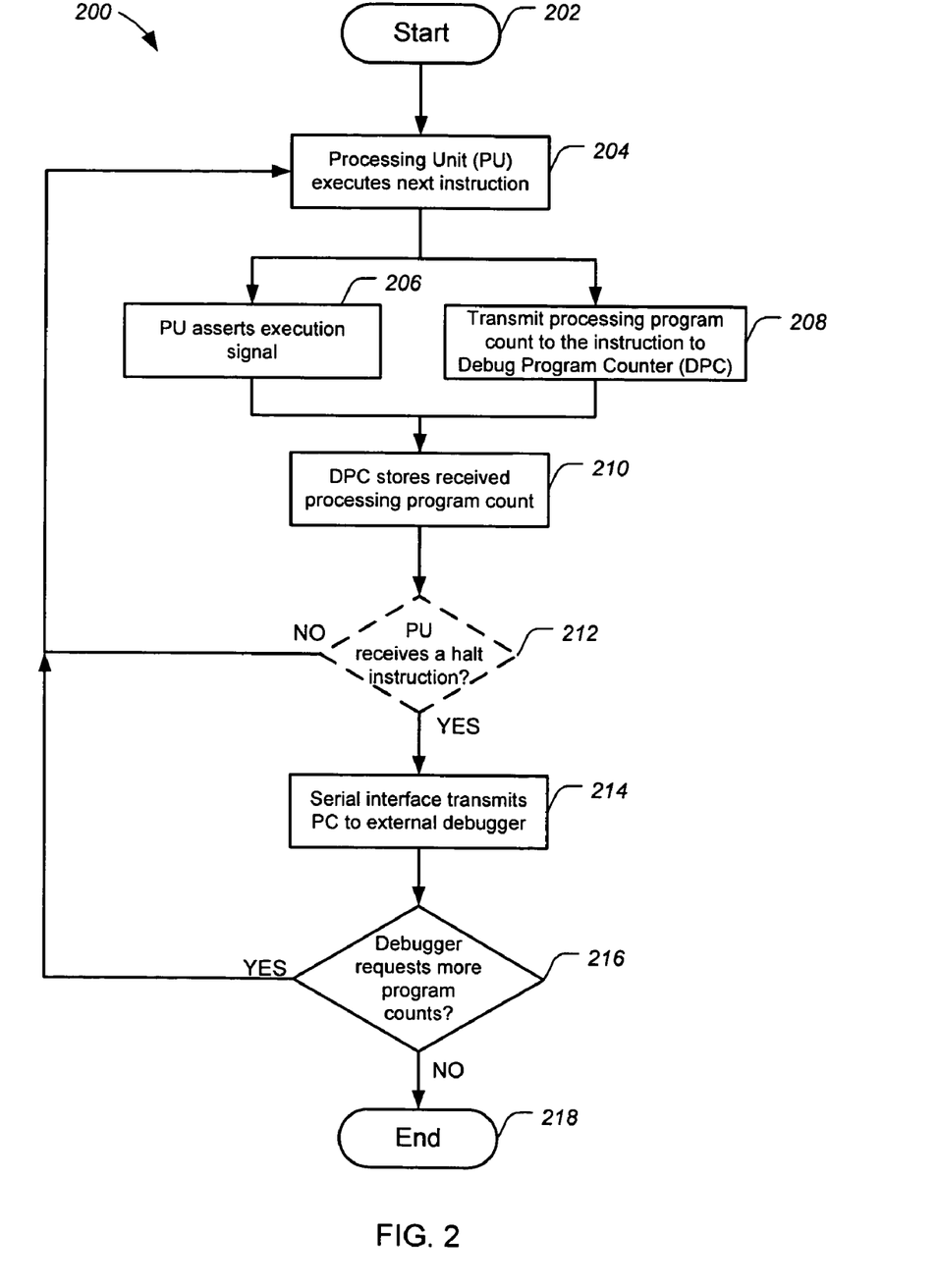
FIG. 2 is a flow chart of exemplary operations that can be performed when a debug session of a microcontroller is in process.

FIG. 2 is a flow chart of exemplary operations 200 that can be performed when a debug session of a microcontroller system is in process. For example, the operations 200 can be performed by the integrated device 107 when an external debugger, such as the debugger 120 is connected to the OCD system 104. The operations 200 can begin in step 202 when the processing unit of the integrated device starts executing a set of instructions included in a program stored in its memory.

In step 204, a processing unit (PU) executes a next instruction. In the test system 100, the PU is the CPU 112, which fetches an instruction from the memory 114 using the program count value in the PC 116, which specifies the address of the instruction. Then, the PU, in step 206, can assert an execution signal and, in step 208, transmit a processing program count to the DPC 110. Step 208 and step 206 may be executed substantially simultaneously. In this example, the execution signal is a write enable signal that enables writing of the transmitted program count value into the DPC 110. In another implementation, the integrated device 107 executes step 206 before step 208. The integrated device 107 first asserts the execution signal to enable the DPC 110 for a write and then transmits the program count value to the DPC 110. For example, when the clock rate of the CPU 112 is fast, the integrated device 107 can be configured to enable the DPC 110 first so that the DPC 110 ready to receive the program count value.

In other implementations, the integrated device 107 first transmits the program count value and then asserts the execute signal to enable the DPC 110 for write. For example, the DPC 110 can be implemented so that a write to the DPC 110 occurs only when an assertion of the execution signal is detected. The PC bus transmitting the program count value can be active all of the time, but the value is not accepted until the execution signal is received.

Furthermore, in another implementation, the execute signal is not implemented if there is no need to validate the value stored in the DPC 110. For example, the DPC 110 may not need an enable signal because the DPC 110 updates the stored value at every clock cycle. In another example, the DPC 110 receives other signals, such as a confirm signal from the debugger 120, as a write enable signal.

Upon receiving the execution signal, the DPC 110 loads the received processing program count value in step 210. Next, in an optional step 212, the integrated device 107 determines whether the PU received a halt instruction. For example, the PU can receive a halt instruction when it executes a software breakpoint previously inserted by the debugger 120 in the program code, or the PU can receive a halt signal directly from the debugger 120 via the JTAG communication link 111. If the PU did not receive a halt signal, then the PU executes the next instruction in step 204. Otherwise, in step 212, if the PU received the halt signal, then, in step 214, the serial interface, such as the JTAG TAP 108, can transmit the stored program count to an external debugger, such as the debugger 120. For example, the debugger 120 can receive the program count value stored in the DPC 110 at the time the CPU 112 is halted.

In another example, after step 210, the integrated device 107 executes the step 214 immediately without the optional step 212. After the serial interface transmits the program count to the debugger 120, the integrated device 107 can, in step 216, determine whether the debugger 120 is requesting more program counts. If the debugger 120 is requesting more program counts, then the integrated device 107 returns to execute step 204. In this way, the debugger 120 can continuously collect program count values to perform a statistical analysis of the code profile using the histographical analysis module 122. Otherwise, in step 216, if the debugger 120 is not requesting more program counts, the operation 200 ends in step 218.

Figure 3A:
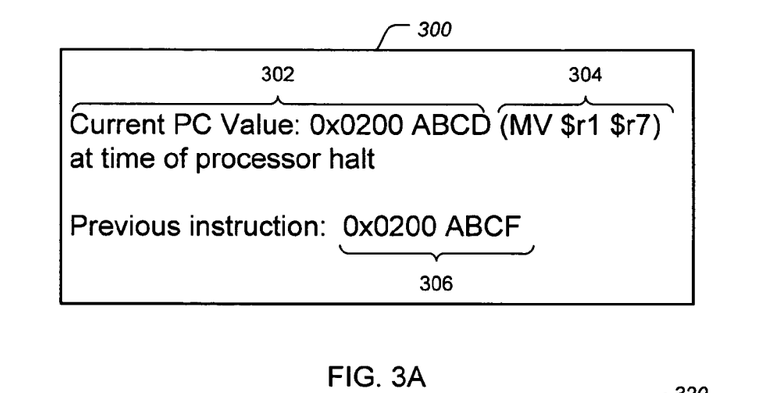
FIGS. 3A-3B are exemplary displays of the output of a debug tool.
Figure 3B:
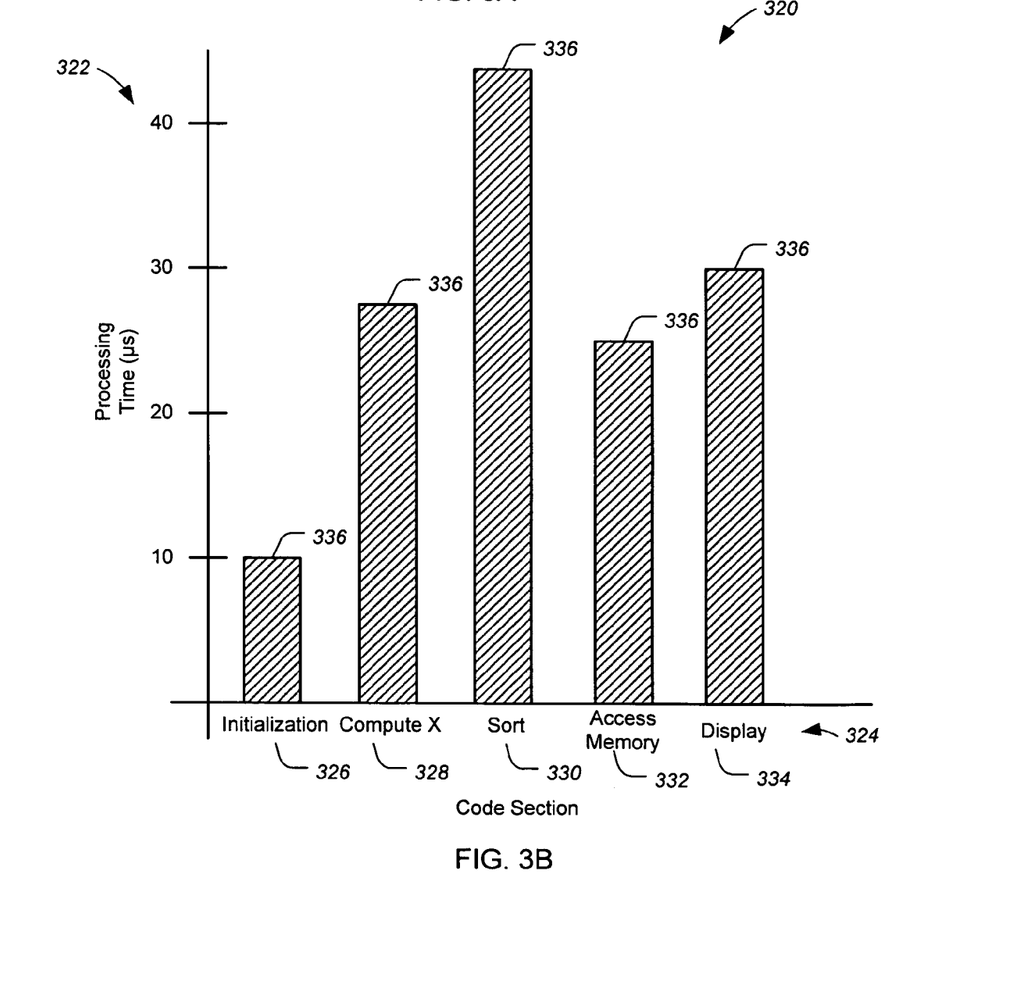

FIGS. 3A-3B show exemplary outputs of the test system 100. The outputs can be displayed on the display device 124 described in FIG. 1. Referring to FIG. 3A, a display output 300 is depicted which shows an example of output generated when the CPU 112 is halted and the DPC 110 is read by the debugger 120. As shown, the display output 300 includes a current program count value 302 and associated data. In some implementations, the associated data is of the form of a translation 304 of the instruction stored at the address specified by the current program count value 302. In the depicted example, the current program count value 302 is displayed in hexadecimal format. In another example, the current program count value 302 can be displayed in binary format, decimal format, octal format or other suitable format. The translation 304 is a decoded instruction from the memory 114 at a location specified by the current program count value 302. For example, the debugger 120 accesses the memory address, which is equal to the current program count value, to obtain the currently executed instruction code and translate the obtained instruction into a format more easily understandable by users, such as an assembly code format. In the depicted example, the display output 300 also includes a previous instruction 306. In some implementations, multiple values are stored in the DPC 110, and the debugger 120 may retrieve one or more of the previous program counts from the DPC 110.

Referring to FIG. 3B, the histographical analysis module 122 may output information used to generate an exemplary histogram 320. The histographical analysis module 122 can compute a statistical model of a code profile. As shown, the histogram 320 includes a processing time axis 322 and a code section axis 324. The code section axis 324 includes various sections of the executed program. In this example, the code section axis 324 includes an initialization 326, a compute X 328, a sort 330, an access memory 332, and a display 334 code function. In this example, the histographical analysis module 122 accumulates processing time spent on each code section and displays the cumulated time spent on the code section on the histogram 320. The histographical analysis module 122 can record the number of times that an instruction stored at a memory address is being executed and the time required for this execution. Then the histographical analysis module 122 can, based on the record, determine what code functions are specified by the recorded memory addresses and compute how long each code function takes to be executed.

For example, the histographical analysis module 122 can associate the recorded program count values and the corresponding execution times with their corresponding code sections, such as separate functions or methods executed by the CPU 112. Then the histographical analysis module 122 can display the cumulative time for each function on the display device 124. In the histogram 320, the cumulated time is displayed as vertical bars 336, each of which correspond to a separate code section. For example, the histogram 320 indicates that the program code spent 10 μs of total processing time on executing instructions used in an initialization function. The user can use the histogram 320 to determine what sections of the code would benefit the greatest from code optimization. For example, there may be a strict timing requirement for a section of the code that dictates that it must be finished within a specified amount of time. From the histogram 320, the user may determine which section of the code exceeds the time requirement. In another example, the user analyzes the histogram 320 and determines that the program spends too much time on the sort 330 algorithm. The user can then focus on optimizing the algorithm in the sort 330.

Figure 4:
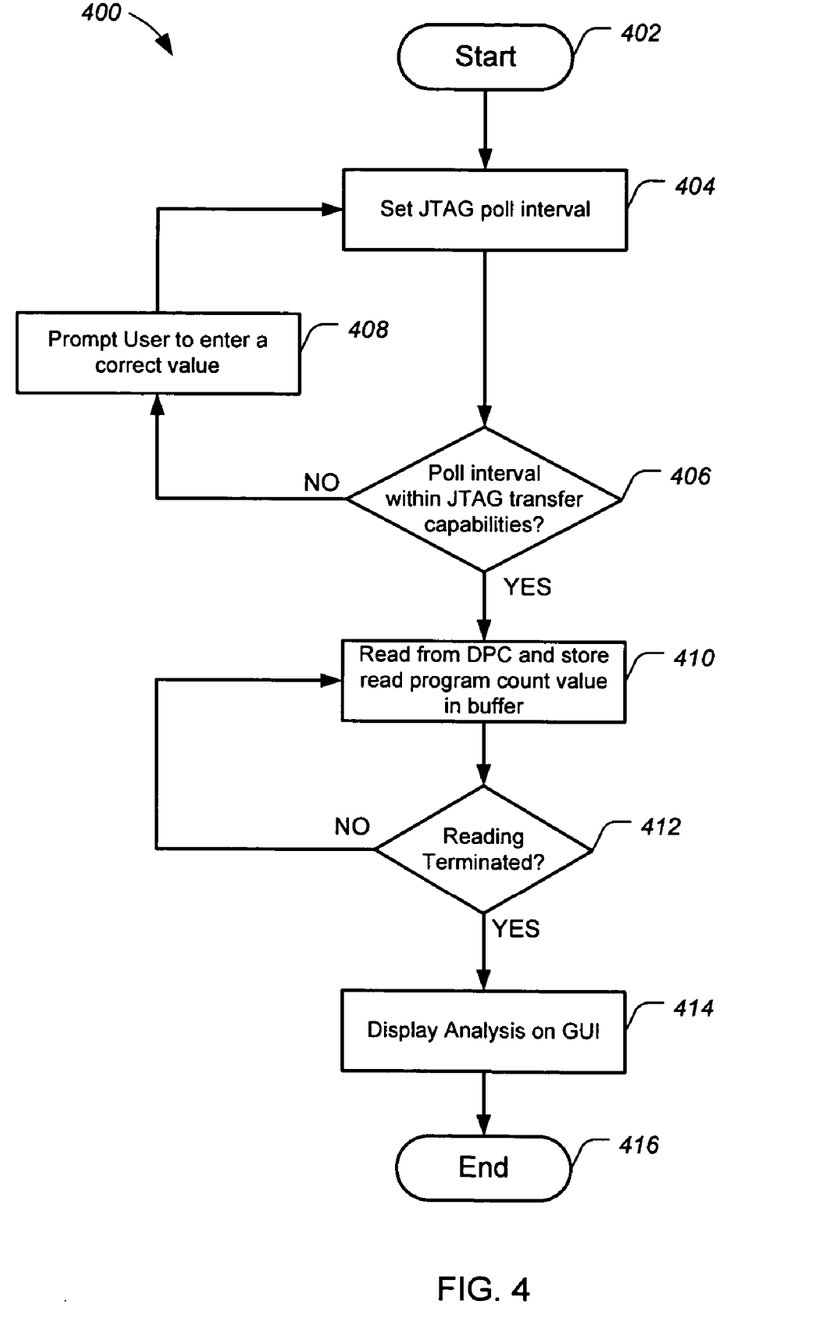
FIG. 4 is a flow chart of exemplary operations 400 for constructing a statistically correct model of a code profile.

FIG. 4 is a flowchart of exemplary operations 400 for constructing a statistical model of a code profile. The operations 400 can be performed by the debugger 120. The operations 400 begin in step 402 when the software front-end 118 receives a command to perform a code profiling analysis on program code executed by a device under test. For example, the software front-end 118 issues a command to the debugger 120 to start retrieving information for code profiling when the software front-end 118 receives a start code profiling analysis instruction from the user interface or from a test program downloaded in the debug system 102.

In step 404, the debugger 120 can set a JTAG poll interval. The JTAG poll interval can determine the frequency of reading of the DPC 110. In some implementations, the poll interval is specified in the test program run by the debugger 120. In other implementations, the poll interval is entered by a user. In one example, if the user desires a more accurate analysis, then the user selects a shorter poll interval so that the debugger 120 receives program count values more frequently. In another example, if the user desires a relatively courser analysis in order to save memory space or bandwidth, then the user selects a longer poll interval so that the debugger 120 receives program count values less frequently.

The debugger 120 can determine, in step 406, whether the set poll interval is within the JTAG transfer interface capabilities. If the set poll interval is not within the JTAG interface transfer capabilities (e.g., the poll interval requires the JTAG interface to transfer program count values at a speed exceeding its maximum transfer rate), then the debug system 102 can prompt the user to enter a greater interval, and the operations 400 return to step 404. Otherwise, if, in step 406, the set poll interval is within the JTAG interface's transfer capabilities, then the debugger 120 can, in step 410, read the program count value from the DPC 110. In some implementations, the debugger 120 can obtain program count values concurrently with the execution of instructions by the CPU 112.

The debugger 120 can determine whether the reading operation is terminated in step 412. If the reading operation is not terminated, then the operations 400 return to step 410. If the reading operation is terminated in step 412 (e.g., the program is completed), then the debugger 120 can display, in step 414, an analysis result on the display device 124 and the operations 400 end at step 416.

Figure 5:
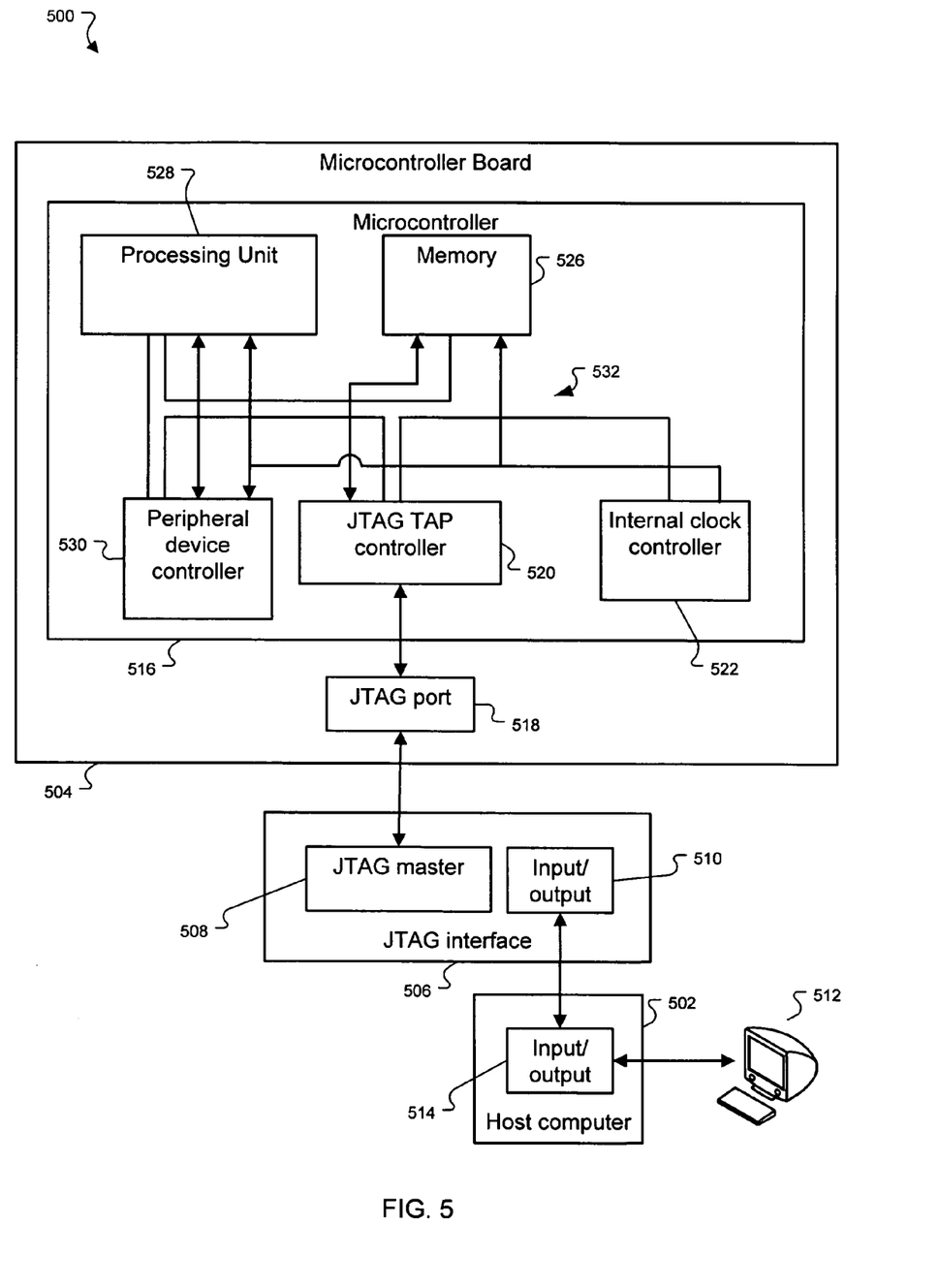
FIG. 5 is a schematic diagram of a general microcontroller testing system.

FIG. 5 is a block diagram of an exemplary computer system that is capable of debugging and optimizing program code executed in a microcontroller. The computer system 500 includes a host computer 502 that is connected to a microcontroller board 504 by way of a JTAG interface 506. The JTAG interface 506 includes a JTAG master 508 and an input/output port 510. A user can operate the microcontroller board 504 using the input/output (I/O) device 512, which is connected into an input/output port 514 on the host computer 502. For example, the user sends control information to the board via the input/output port 514 to the input/output port 510. In particular, the user can type in a command on the keyboard of the I/O device 512 which will be processed by an application running on the host computer 502 resulting in an instruction being sent to the JTAG interface 506. In some implementations, the instruction is sent from the input/output port 514 to input/output port 510 through a universal serial bus (USB) connection between the host computer 502 or the JTAG interface 506. Although the user device 512 and the host computer 502 are depicted as two in this example, in some implementations, the user device 512 and the host computer 502 are one device, such as a laptop computer.

In the depicted example, the input/output port 510 can send received instructions to the JTAG master 508 for interpretation. The JTAG master 508, upon receiving the instruction, can decode the received instruction and transmit one or more appropriate instructions to the microcontroller board 504 to execute the received instruction.

The microcontroller board 504 includes a microcontroller 516 and a JTAG port 518. The microcontroller 516, in this example, is a single integrated circuit (IC) that includes a JTAG TAP controller 520, an internal clock controller 522, memory 526, a processing unit 528 and a peripheral device controller 530. Signals sent from the JTAG master 508 to the pins on the JTAG port 518 can include the JTAG clock (TCK), the test data out (TDO), test data in (TDI) and test mode select (TMS). The signals on these pins can be received on corresponding inputs on the JTAG TAP controller 520. In some embodiments, the test reset (TRST) signal is sent.

In some embodiments, the JTAG TAP controller 520 can process the instruction and data information to determine the test interface to measure or control within the microcontroller 504. For example, the JTAG TAP controller 520 can include a state machine to control the operation of the JTAG port 518. The TDO and TDI signals can comprise the internal JTAG signals 536 which are connected to all of the circuits within the microcontroller 516. The internal clock controller 522 can include logic to generate the internal clock signal, which can be used by the modules contained within the microcontroller. In some implementations, the JTAG TAP controller 520 can use the TCK clock provided by the JTAG master 508. The processing unit 528 can provide the core logic and control for the microcontroller 516 and can utilize the memory 526 for storage of its program instructions as well as data. The memory 526, for example, can include Electrically Erasable and Programmable Read Only Memory (EEPROM) for instruction storage and Dynamic Random Access memory (DRAM) for data storage. In another example, the memory 526 includes Flash memory and Static Random Access Memory (SRAM).

The peripheral device controller 530 can include the logic for the microcontroller 516 to connect to and/or communicate with other devices. For example, the controller can contain logic for the microcontroller 516 to connect to a digital signal processor allowing it the ability to process digital image data, for example, a color image from a digital camera. In this example, the digital image data is received by the microcontroller by way of an input device connected to the peripheral device controller.

The microcontroller 516 includes buses 532 that can transmit address and data bits that are propagated throughout the microcontroller 516 that can allow the core logic in the processing unit 528 to access and control the other logic modules within the microcontroller 516.

A number of embodiments have been described. Nevertheless, it will be understood that various modifications may be made without departing from the spirit and scope of the described embodiments. For example, the register that receives the program count from the CPU 112 may be a general purpose register. Additionally, the OCD System 104 can include other components and interfaces not shown, such as a trace interface also used to transmit the program count values to the debugger 120. Furthermore, the components included in the OCD system 104 may be located on a separate device from the MCU system 106. For example, DPC 110 and JTAG TAP 108 may be part of a separate integrated circuit that is connected to the MCU system 106. Accordingly, other embodiments are within the scope of the following claims.

What is claimed is:

1. A method for debugging a device under test, comprising:
   accessing, using a debugging device, a serial interface on an integrated device comprising a processing unit and a debug register that stores a program count value that specifies an address of an instruction for execution by the processing unit;
   retrieving the program count value from the debug register using the serial interface substantially concurrently with the execution of instructions by the processing unit;
   storing the program count value in a buffer on the debugging device, wherein the debugging device is external to the integrated device;
   transmitting an instruction to halt the processing unit before retrieval of a second program count value from the debug register; and
   retrieving the second program count value from the debug register and storing the second program count value in the buffer on the debugging device.

2. The method of claim 1, further comprising receiving a polling interval from a user of the debugging device indicating an time period to wait before initiating the retrieval of the second program count value.

3. The method of claim 1, further comprising outputting a second instruction associated with the second program count value.

4. The method of claim 1, further comprising statistically analyzing values stored in the buffer on the debugging device to determine a time that the processing unit spends executing one or more groups of instructions.

5. The method of claim 4, further comprising transmitting the values stored in the buffer on the debugging device to a separate computing device to perform the analysis.

6. The method of claim 4, further comprising outputting the results of the statistical analysis in a histogram graph.

7. A method for debugging a device under test, comprising:
   accessing, using a debugging device, a serial interface on an integrated device comprising a processing unit and a debug register that stores a program count value that specifies an address of an instruction for execution by the processing unit;
   retrieving the program count value from the debug register using the serial interface substantially concurrently with the execution of instructions by the processing unit; and
   storing the program count value in a buffer on the debugging device, wherein the debugging device is external to the integrated device; and
   applying a histogram algorithm on the program count value before storing the value in the buffer.

8. The method of claim 7, further comprising retrieving a second program count value from the debug register and storing the second program count value in the buffer on the debugging device.

9. The method of claim 8, further comprising receiving a polling interval from a user of the debugging device indicating an time period to wait before initiating the retrieval of a second program count value.

10. The method of claim 8, further comprising transmitting an instruction to halt the processing unit before retrieval of the second program count value from the debug register.

11. The method of claim 10, further comprising outputting a second instruction associated with the second program count value.

12. The method of claim 7, further comprising statistically analyzing values stored in the buffer on the debugging device to determine a time that the processing unit spends executing one or more groups of instructions.

13. The method of claim 12, further comprising transmitting the values stored in the buffer on the debugging device to a separate computing device to perform the analysis.

14. The method of claim 12, further comprising outputting the results of the statistical analysis in a histogram graph.

* * * * *